M. H. JESTER.
PERFORATED SUPPORT FOR RECEIVING STUCCO AND OTHER PLASTERING MATERIALS.
APPLICATION FILED NOV. 15, 1912.
1,123,304.
Patented Jan. 5, 1915.
2 SHEETS—SHEET 1.
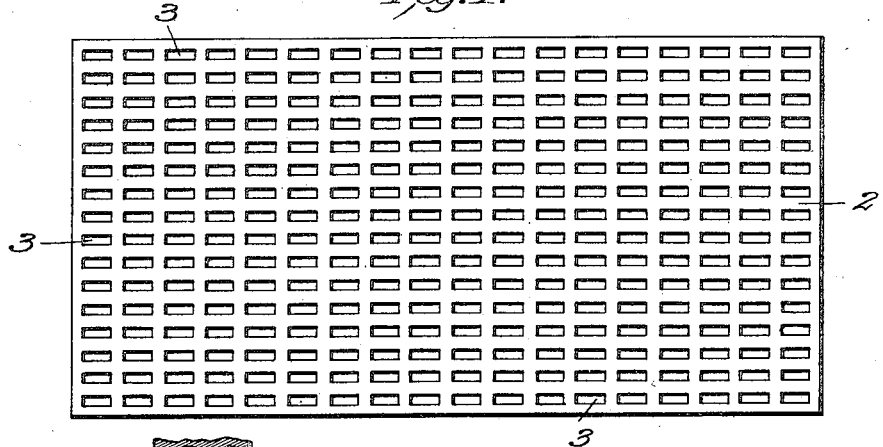
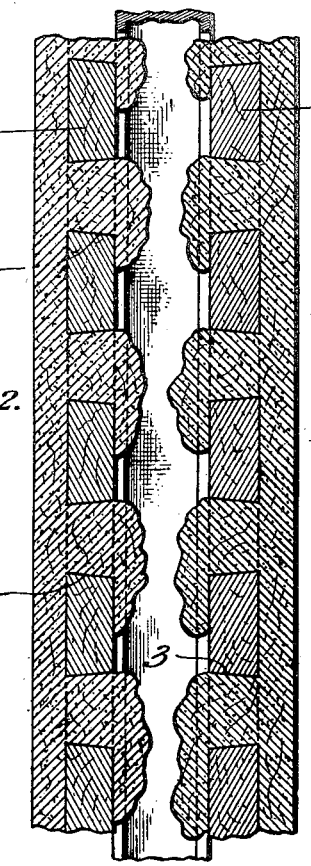
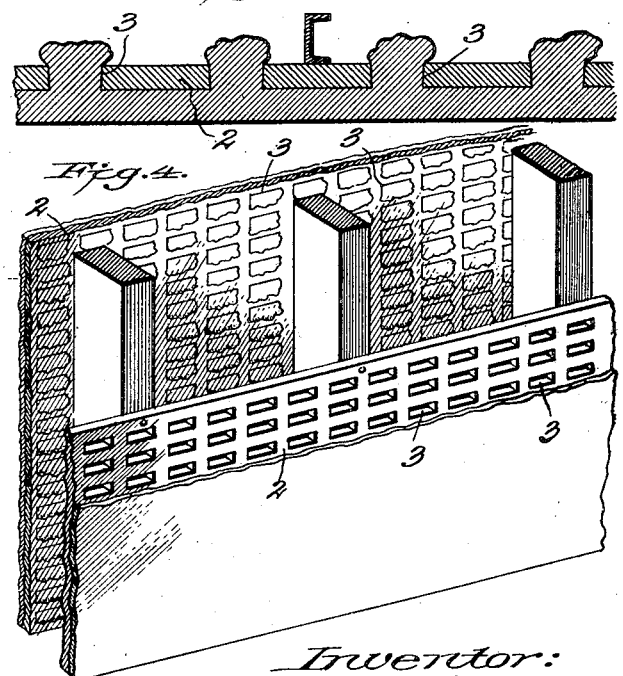

M. H. JESTER.
PERFORATED SUPPORT FOR RECEIVING STUCCO AND OTHER PLASTERING MATERIALS.
APPLICATION FILED NOV. 15, 1912.
1,123,304.
Patented Jan. 5, 1915.
2 SHEETS—SHEET 2.
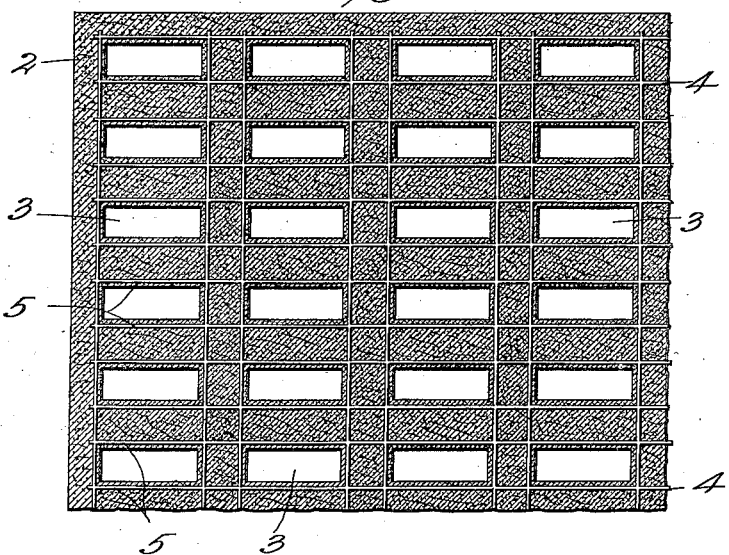
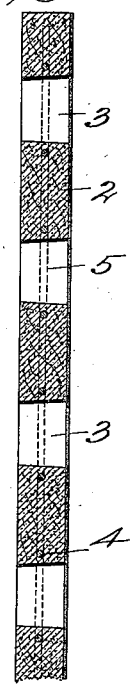
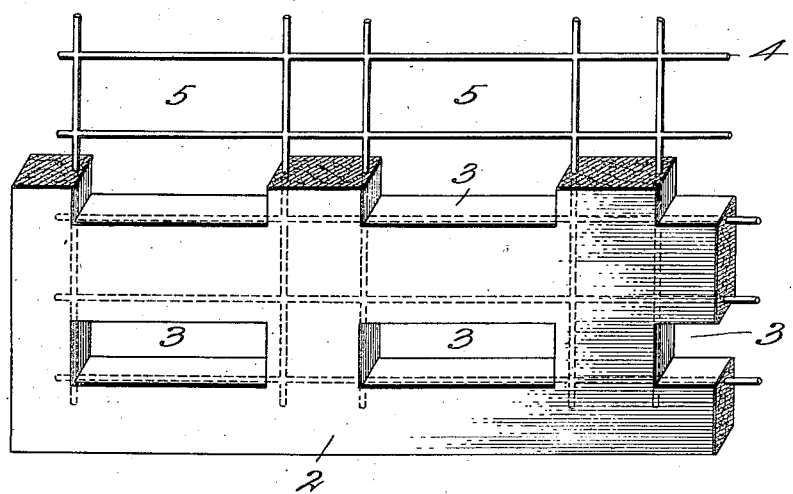

UNITED STATES PATENT OFFICE.

MARVIN H. JESTER, OF DENVER, COLORADO, ASSIGNOR TO THE M. H. JESTER INVESTMENT COMPANY, A CORPORATION OF COLORADO.

PERFORATED SUPPORT FOR RECEIVING STUCCO AND OTHER PLASTERING MATERIALS.

1,123,304.

Specification of Letters Patent.  Patented Jan. 5, 1915.

Application filed November 15, 1912. Serial No. 731,618.

*To all whom it may concern:*

Be it known that I, MARVIN H. JESTER, a citizen of the United States of America, residing in the city and county of Denver and State of Colorado, have invented a new and useful Perforated Support for Receiving Stucco and other Plastering Materials, of which the following is a specification.

My invention relates to a new perforated support for receiving stucco and other plastering materials used in architectural work for partitions, cornice interior finish, and decorative plaster work, and the objects of my invention are: First, to provide a support for receiving stucco and other plastering materials, that is provided with such an open mesh surface that the stucco plaster and other plastering material will flow readily through its meshes and clench to its opposite side when applied thereto. Second, to provide a support for stucco and other plastering materials that may be made of any suitable form, and that may contain in its surface any number of stucco or other plastering mortar entering apertures, and which may be of any form or shape of outline and that may be made in any arrangement relative to the size and shape of the plaster receiving support desired, and that may be made of and be composed of any suitable plastic or other suitable material, or that may be made of any suitable compound or any suitable combination of plastic and other suitable materials, and reinforced with wire netting or wire screen material of any suitable material which is embedded in the supports.

My invention consequently contemplates a perforated stucco or other plastering material receiving perforated support of any form or shape and of any character, and one that is preferably reinforced by wire netting, although if desired for certain kinds of work this feature may be omitted.

I attain these objects by the mechanism illustrated in the accompanying drawings, in which:

Figure 1 is a side elevation of one of my improved stucco plaster supports, showing the preferred shape and arrangement of mortar clenching apertures, which, like the support, are of rectangular shape. Fig. 2 is a cross section through a partition showing a channel iron stud with a mortar or stucco plaster receiving support against its opposite sides, and with coats of plastering material applied to the outside surfaces of the support, and showing how the mortar flows through the mortar clenching apertures in the support and overlaps the inner edges and adjoining sides of the support. Fig. 3 is a section of a ceiling showing a channel iron ceiling beam, against which the supports are to be secured, and showing the clenching hold the plastering material has through the clencher apertures in the support and on its opposite inner sides. Fig. 4 illustrates my improved plastering material supports applied to wooden studding and shows a narrow support partially covered with plastering material on one side and a wider support covered with plastering material on the other side of the wooden joists. Fig. 5 illustrates an enlarged fragmentary piece of a support in longitudinal section, showing the arrangement of the wire netting around its mortar receiving apertures and its arrangement within the support when molded therein. Fig. 6 illustrates an end elevation in section, of a piece of plastering material support, and shows the ends of the wires of the wire netting in section in the position in which they are molded in the supports; and Fig. 7 illustrates a fragment of a support and of a piece of the wire netting in perspective.

Similar letters of reference refer to similar parts throughout the several views.

I have illustrated, however, but one shape of support, and preferably illustrate a thin rectangular shaped support 2 as shown in Fig. 1. This support is perforated with preferably rectangular shaped apertures 3 arranged in vertical and horizontal rows, which arrangement enables the supports to be cut or broken along the lines of the apertures. I preferably mold in the support, wire netting 4 that has a rectangular form of mesh 5, of a size enough larger than the apertures in the support to fit close to the inner edges of the walls of the rectangular apertures of the support and still be molded wholly within the body of the support, so that they will not come loose from the body of the support along the walls of the apertures, but will lie so close to these walls that when the support is broken either vertically or horizontally, these wires can be easily cut with any suitable tools. This arrangement as to size and position of the square wire meshes relative to the walls of the apertures is made, as it is sometimes necessary to cut the supports into pieces to fit into corners, coves, panels, angles, and for cornices and moldings and other interior stucco and plaster work.

My improved stucco plastering supports are preferably molded in suitable molds in which the wire netting is placed in position to be embedded in the soft stucco plastering material as it is poured into the mold. These supports can, however, be made by a system of pressure such as by the pressure of plungers or rollers, it being only necessary to provide molds with core portions that are adapted to form the apertures in the supports and that are arranged to support the wire netting around these cores in the proper position to be molded in the central portion of the support.

In Figs. 5, 6, and 7 I have illustrated the wire netting in fragmentary parts of a support, to show the preferred relative arrangement of the wire squares around the apertures of the support.

My invention provides a support for stucco, plastic and plastering cements and mortars and other plastering materials that is strong enough to receive severe knocks, and rough handling, without destructive or detrimental breakage, and one that can be readily cut, trimmed and fitted into small, irregular shaped places, and that is perforated to allow the plastering material to flow through it and to overflow around the opposite side edges of the mortar clenching apertures in it and clench permanently, firmly and strongly enough to it to carry any thickness and weight of mortar it is desired to plaster on it, without any danger of falling or cracking off from vibratory or trembling actions or any ordinary water or heat action which would not be severe enough to disintegrate the stucco plastering material itself.

Having described my invention, what I claim as new and desire to secure by Letters Patent, is:

1. In a supporting member for receiving stucco plastering materials, the combination of a molded member provided with rows of plaster-receiving apertures, with a reinforcing member embedded therein, comprising double rows of wires lying between said apertures in said molded member, the wires of said rows being adjacent said aperture.

2. In a supporting member for receiving stucco plastering materials, the combination of a molded member provided with rows of plaster-receiving apertures, with a reinforcing member embedded therein, comprising double rows of wires lying between said apertures, one of said wires lying adjacent one row of apertures and the other of said wires lying adjacent the other row of apertures.

In testimony whereof I affix my signature in presence of two witnesses.

MARVIN H. JESTER.

Witnesses:
 G. SARGENT ELLIOTT,
 ELIZABETH SMITH.